United States Patent [19]
Minter et al.

[11] 4,442,618
[45] Apr. 17, 1984

[54] DECORATIVE ORNAMENTATION FOR A RUBBER ARTICLE AND METHOD FOR MAKING SAME

[75] Inventors: Thomas F. Minter; Lawrence G. Jansen, both of Akron; Richard H. Springford, Stow, all of Ohio

[73] Assignee: The Goodyear Tire & Rubber Company, Akron, Ohio

[21] Appl. No.: 349,409

[22] Filed: Feb. 16, 1982

[51] Int. Cl.³ .................. G09F 21/04; B60C 13/00
[52] U.S. Cl. .................................. 40/587; 40/596; 152/353 G; D12/137
[58] Field of Search .................. 40/587, 596, 616; 152/DIG. 12, 352 R, 353 R, 353 C, 353 G; D12/134, 137; 273/58 J, 58 K

[56] References Cited

U.S. PATENT DOCUMENTS

| D. 46,367 | 9/1914 | McClurg | D12/137 |
|---|---|---|---|
| D. 65,946 | 11/1924 | Beegle | D12/137 |
| 3,382,120 | 5/1968 | Rudder | 156/116 |
| 3,512,777 | 5/1970 | Henderson | 273/65 EG |
| 3,607,498 | 9/1971 | Kubota | 156/116 |
| 4,041,652 | 8/1977 | Graven et al. | 156/116 |
| 4,198,774 | 4/1980 | Roberts et al. | 40/587 |
| 4,256,159 | 3/1981 | Williams | 156/116 |
| 4,343,342 | 8/1982 | McDonald | 40/587 |
| 4,365,436 | 12/1982 | Ritchey | 40/616 |

Primary Examiner—Robert P. Swiatek
Attorney, Agent, or Firm—Frank Pincelli

[57] ABSTRACT

An indicium for a rubber article having at least one narrow groove therein, the indicium being made of a rubber of a first color such that the narrow groove is perceived as a narrow line of a contrasting color and a method for making same.

14 Claims, 10 Drawing Figures

DECORATIVE ORNAMENTATION FOR A RUBBER ARTICLE AND METHOD FOR MAKING SAME

The foregoing abstract is not to be taken as limiting the invention of this application, and in order to understand the full nature and extent of the technical disclosure of this application, reference must be made to the accompanying drawings and the following detailed description.

This invention relates to a distinctive indicium for rubber articles and a particular method of providing same. The present invention is especially adapted for use in the sidewall of a tire.

In the prior art it has become very popular to provide decorative ornamentation on the sidewall of the tire. The most common decorative feature found on the sidewall of the tire is a raised colored ring which is most often white in color. It is also common in the prior art to provide on the sidewall of the tire large raised or recessed colored letters. However, the prior art has been limited with respect to illustrating large decorative features devoid of detailed ornamentation.

Applicants have discovered a novel and distinctive indicium for the surface of rubber articles and a novel method for producing same which is capable of illustrating intricate decorative features.

DETAILED DESCRIPTION OF THE DRAWINGS

Figure 1:
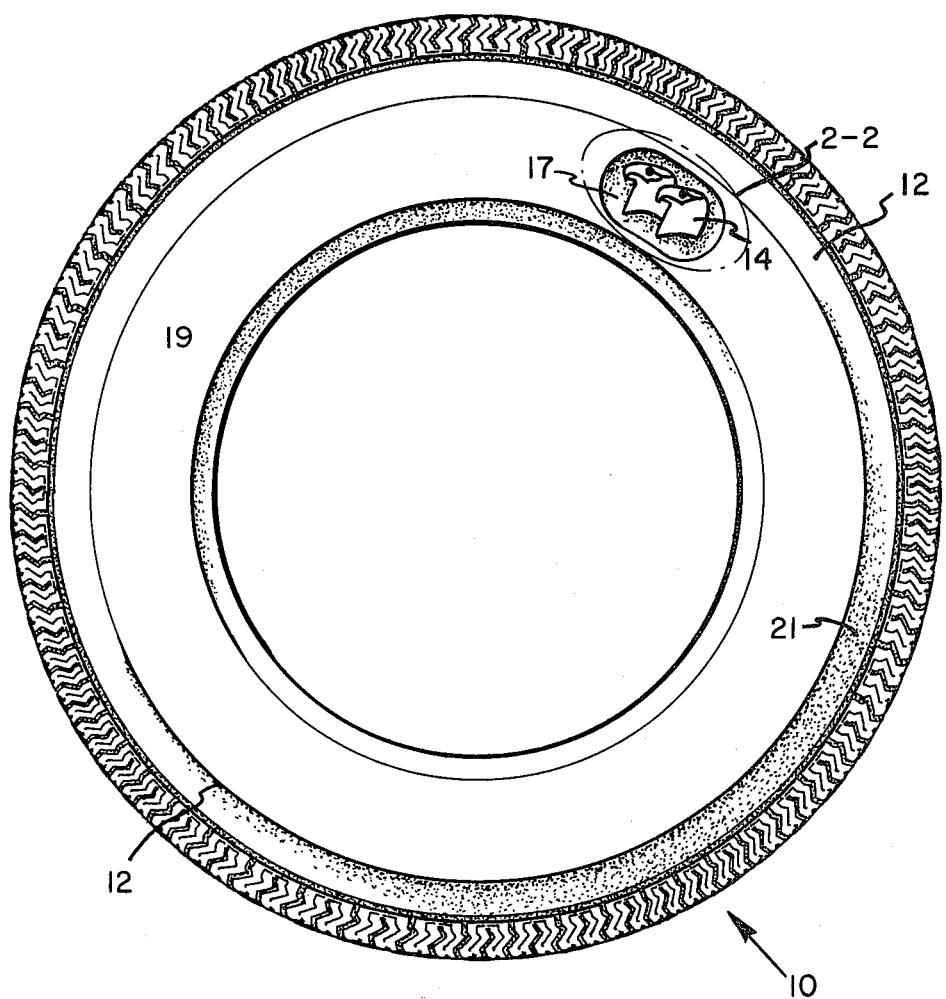
FIG. 1 is an elevational side view of a pneumatic tire provided with an indicium made in accordance with the present invention.
Figure 2:
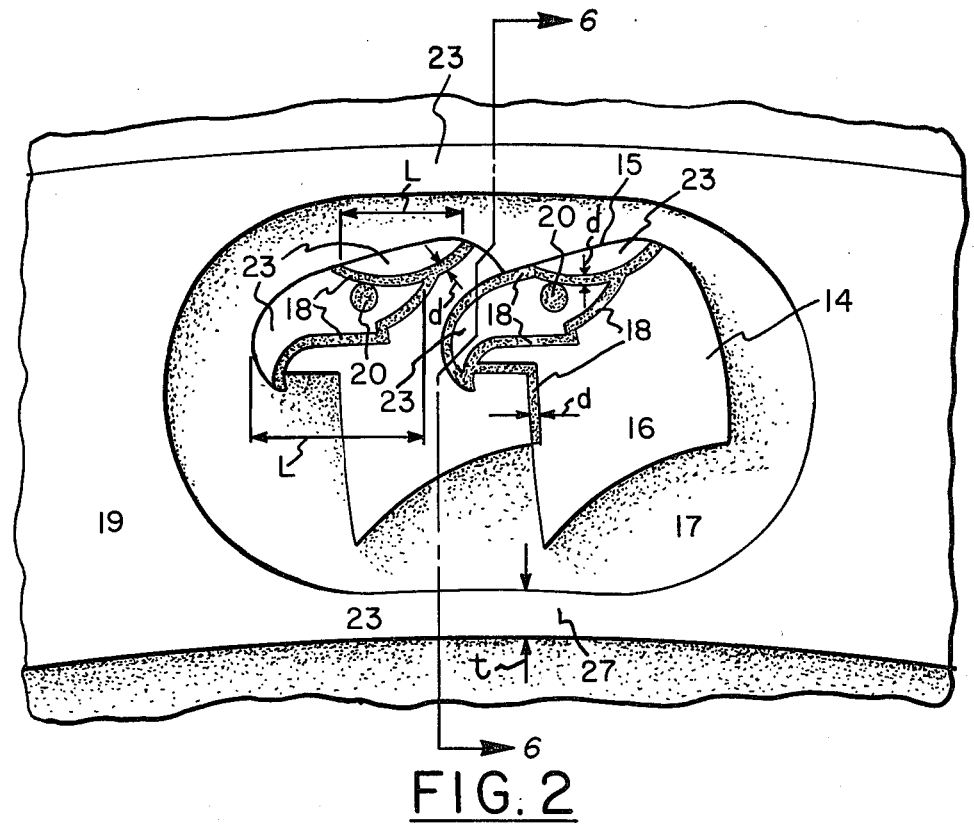
FIG. 2 is an enlarged fragmentary elevational side view of the portion of FIG. 1 which is circled.

Referring to FIGS. 1 and 2, there is illustrated a tire 10 having a sidewall portion 12. Formed on the surface of the sidewall portion 12 is an indicium 14 made in accordance with the present invention. In the embodiment illustrated, indicium 14 comprises a raised portion 16 which is surrounded by a recessed portion 17. The indicium 14 has an outer periphery 15 and is provided with a plurality of narrow grooves or blades 18 and a pair of recessed portions 20. The outer periphery 15, blades 18 and recessed portions 20 combine to form an outline representation. In the particular embodiment illustrated, the outline representation is that of two eagle heads; however, the present invention is not limited to such. The outline representation may be of any desired configuration. Accordingly, the actual configuration of the outer periphery 15, blades 18 and recessed portions 20 may be provided in any desired shape and combination. While the particular embodiment illustrates indicium 14 as being raised with respect to the sidewall surface 21 of the tire, indicium 14 may be flush or below the sidewall surface of the tire.

The blades 18 each have a cross-sectional width d not greater than approximately 0.152 cm (0.060 inches), generally not greater than 0.101 cm (0.040 inches) and preferably not greater than 0.076 cm (0.030 inches). In the particular embodiment illustrated, the blades 18 each have a cross-sectional width d of approximately 0.051 cm (0.020 inches). The blades 18 each have a width which forms a line representation such that the blades 18 are perceived as a narrow line of a contrasting color with respect to portion 16. In order to provide a distinct and clear outline representation, the raised portion 16 is made of a rubber having a color which is in contrast with the lines formed by the blades 18. Preferably, raised portion 16 is made of a light color rubber as the blades are generally perceived as dark lines. In the particular embodiment illustrated, the raised portion 16 is made from a white colored rubber and the blades are perceived as black lines. The surface of recessed portion 17 is made of a rubber having a color which is different from that of the raised portion 16. In the particular embodiment illustrated, the color of the surface of recessed portion 17 is black; however, the surface of recessed portion 17 may be made of any color desired.

In the particular embodiment illustrated, the tire 10 is provided with a substantially continuous raised rib 19 which completely surrounds recessed portion 17, forming narrow ridge portions 23 adjacent the recessed portion 17. The rib 19 has a color which is the same as raised portion 16. The ridge portions 23 each have a minimum cross-sectional thickness t so that the color at the surface 27 of the narrow ridge does not become unclear due to intermixing of the rubber of the rib with the rubber of the recessed portion or rubber in the sidewall portion of the tire. Preferably, ridge portions 23 have a cross-sectional thickness not less than about 0.304 cm (0.120 inches).

Figure 3:
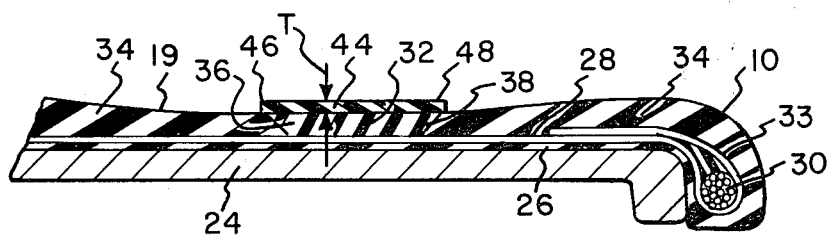
FIG. 3 is a fragmentary cross-sectional view of a portion of a tire illustrating the construction of the sidewall portion while the tire is still on the tire building drum.

Referring to FIG. 3, there is illustrated a fragmentary view of a tire 10 on a tire building drum 24 which comprises a plurality of components which have been successively wrapped about the tire building drum. The particular tire 10 illustrated includes an inner liner 26 and a carcass reinforcing ply structure 28 wrapped circumferentially about the tire building drum 24. A substantially inextensible bead core 30 is provided at each of the axially outer ends of the drum 24 and the axially outer ends 33 of the carcass 28 are each wrapped respectively about the bead core 30. In accordance with the present invention, a strip of subsurface layer 32 of a vulcanizable rubber material is wrapped circumferentially about the carcass 28 in the area of the tire 10 which is destined to become the raised portion 16 and raised rib portion 19 of the sidewall. Additional layers of sidewall rubber 34 are also wrapped circumferentially about the tire on opposite sides of the subsurface layer 32. The layers 34 would normally be black while the subsurface layer 32 would be of a contrasting color, for example, white. A thin surface layer 44 of vulcanized elastomeric material is then wrapped circumferentially about the tire in a central position with respect to the subsurface layer 32. The layer 44 has its lateral edges 46,48 overlapping the lateral edges 36,38 of layer 32. The thin surface layer 44 is of a different color with respect to the subsurface layer 32 and may or may not be the same in color with respect to sidewall layers 34. It is important that the thickness T of layer 44 not be too great as this would interfere with providing a clear outline representation being formed by the blades 18. If the thickness T of layer 44 is too large, the distinction between the blades 18 and the surface of the raised portion 14 would be substantially reduced due to the intermixing of the rubber of layer 44 with the rubber of layer 32. Additionally, the thickness T of layer 44 should not be too thin as then the rubber of recessed portion 17 will split and therefore become discontinuous thereby showing the contrasting color of rubber disposed beneath it. Accordingly, it is preferred that the thickness T of layer 44 in the unvulcanized state not be greater than 0.102 cm (0.040 inches) and a thickness not less than 0.038 cm (0.015 inches). In the particular embodiment illustrated, the unvulcanized layer 14 has a thickness T of about 0.071 cm (0.028 inches).

Figure 4:
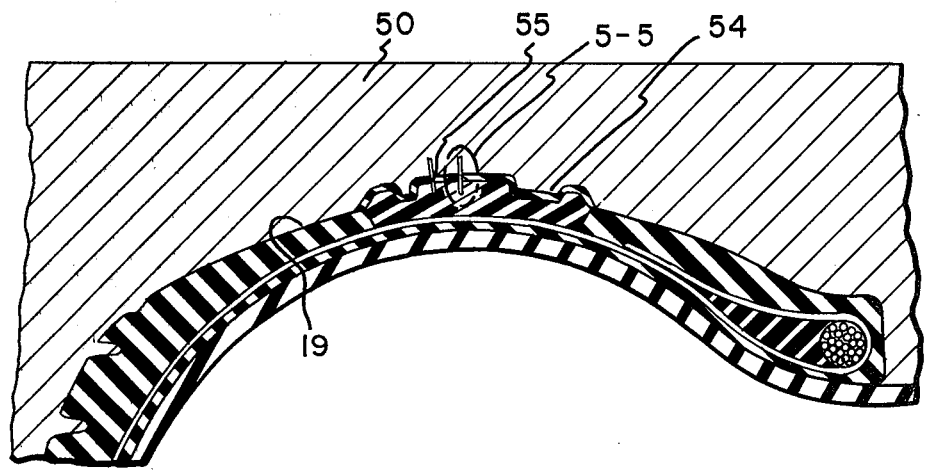
FIG. 4 is a fragmentary cross-sectional view of the tire of FIG. 1 illustrating the tire subsequent to shaping and curing in the mold.
Figure 5:
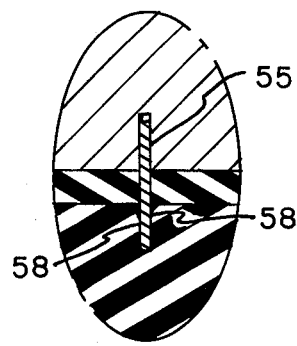
FIG. 5 is an enlarged fragmentary view taken along the line 5—5 of FIG. 4 which illustrates how a portion of the indicium is formed in the sidewall.

As illustrated in FIG. 4, the tire 10 after it has been removed from the tire building drum 24 is placed into mold 50 where under heat and pressure the tire is cured. Portion 16, recessed portion 17, raised rib portion 19, narrow blades 18 and recessed portion 20 are formed in the sidewall by the mold during vulcanization of the tire. The recessed portion 17 is generally formed by large projections 54 in the mold while the blades 18 are formed by inserts 55 which are placed in the mold 50. Preferably, the inserts 55 are made of steel and have a cross-sectional configuration as illustrated in FIG. 5. An important aspect of the present invention is that the inserts 55 make a clear sharp groove or blade 18 in the portion 16. Accordingly, the sides 58 of inserts 55 should be substantially flat and oriented in the mold such that when it is pressed into the unvulcanized tire it will be at an angle of approximately 90° to the surface of the tire. Preferably, when the tire is expanded in the mold 50, the inserts 55 pass through layer 44 and extend into layer 32.

Figure 7:
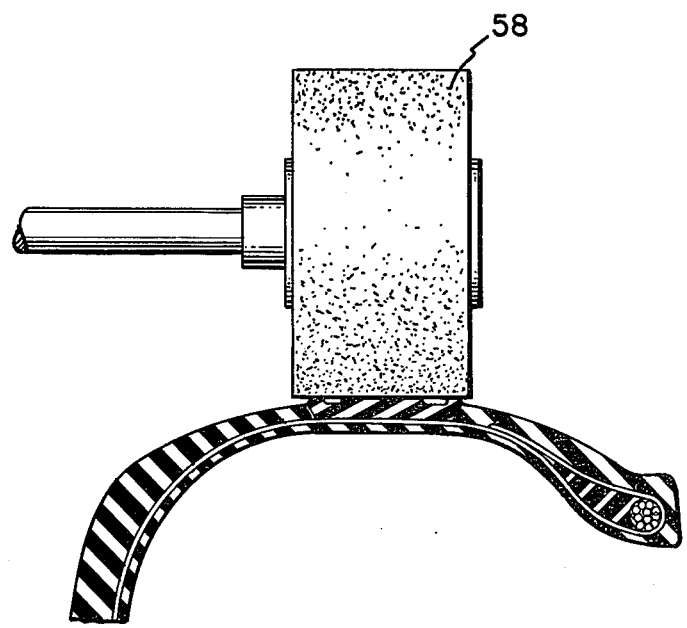
FIG. 7 is a cross-sectional view of the tire of FIG. 1 illustrating the grinding operation used to expose the indicium on the sidewall.

Referring to FIG. 7, after curing the tire 10 is removed from the mold, inflated and mounted on a spindle (not shown) for rotation about its axis. The tire 10 is rotated about its rotational axis and a rotating grinding wheel 58 is applied to the raised portion 16 and raised rib portion 14 of the sidewall to remove a thin layer of elastomeric material from the generally flat circular surface thereof. A sufficient amount of rubber is removed so as to expose the subsurface layer 32 but not enough to remove the raised portion 16 or narrow blades 18. It can, therefore, be seen that the color of the raised portion 16 and rib portion 19 will be substantially that of subsurface layer 32 while the recessed portion 17 will have the color of the surface layer 44. Generally, a sufficient amount of elastomeric material is removed so that the blades 18 have a depth of at least 0.102 cm and generally not greater than 0.41 cm. In the particular embodiment illustrated, the depth of blades 18 is about 0.203 cm. In the particular embodiment illustrated, the thin layer of elastomeric material is removed by grinding; however, the present invention is not limited to such. The thin elastomeric layer may be removed by any desired means.

Figure 6:
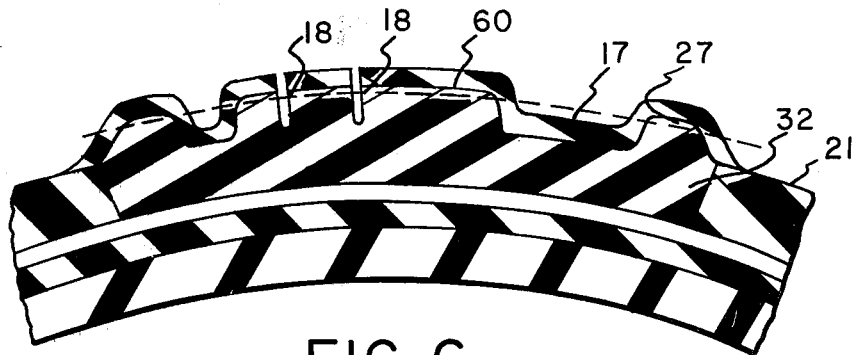
FIG. 6 is a cross-sectional view of the tire of FIG. 2 taken along line 6—6 illustrating the tire after it has been taken from the mold and prior to the grinding operation used to expose the indicium on the sidewall.

Referring to FIG. 6, there is illustrated a cross-sectional view of the raised portion 16 and rib 14 taken along line 6—6 of FIG. 2 illustrating the tire prior to the grinding operation. It can be seen that the inserts 55 and projections 54 which form the blades 18 and recessed portions 17 respectively, extend below the radially outer surface 60 of layer 32. The dash line indicates the approximate level which the surface of the raised portions 16 and rib portion 14 will have after the grinding operation.

Referring back to FIG. 2, it can be seen that in the particular embodiment illustrated the blades 18 and the outer periphery 15 of raised portion 16 form small islands 23 in raised portions 16. The small islands 23 that are formed should have a length L of no less than approximately 0.508 cm (0.2 inches) and preferably, a width no less than about 0.250 cm. (0.1 inches). For the purposes of this invention, the length of islands 23 is measured parallel to the direction to which the grinding wheel operates and the width of the islands 23 is measured perpendicular to the direction in which the grinding wheel contacts the island.

Figure 8:
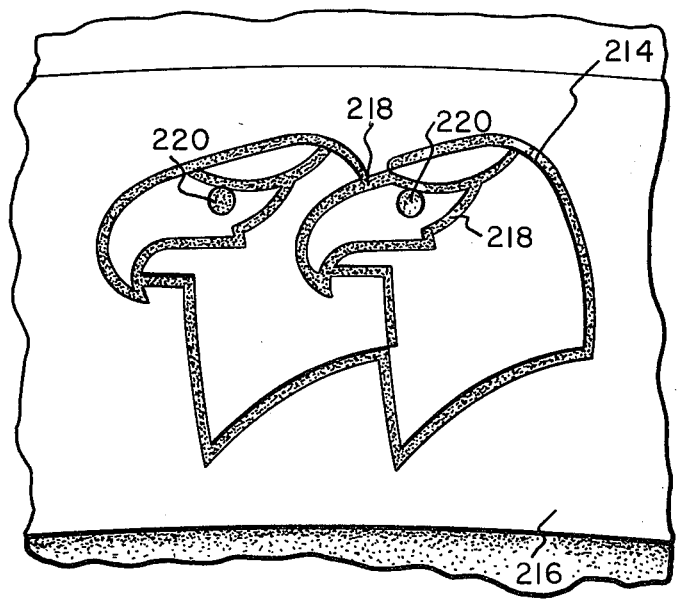
FIG. 8 is an enlarged fragmentary cross-sectional view of a portion of a tire illustrating a modified form of the present invention.

Referring to FIG. 8, there is illustrated a modified form of the present invention. In the particular embodiment illustrated, the recessed portion 17 is entirely omitted and the outline of the indicium 214 is formed solely by narrow blades 218 and raised portions 220 in raised portion 216.

Figure 9:
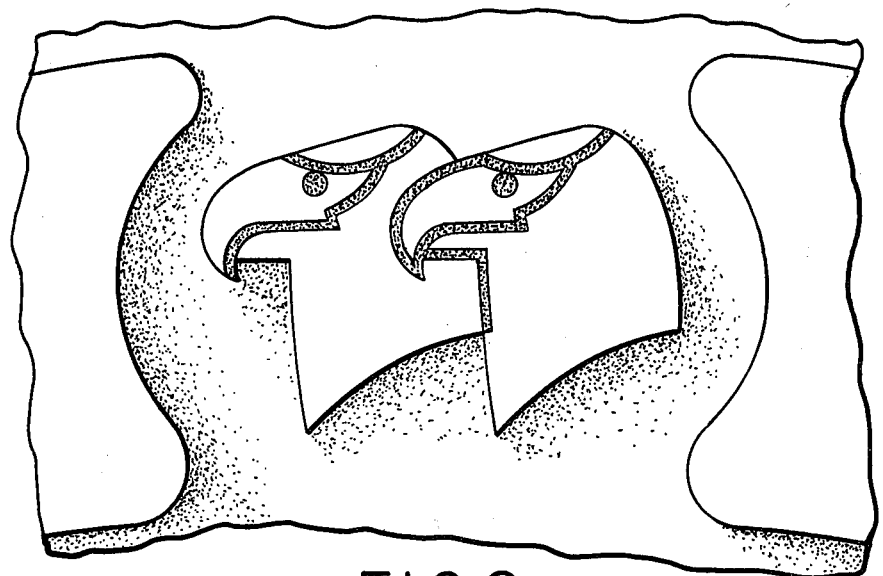
FIG. 9 is an enlarged fragmentary elevational view of the sidewall of a tire illustrating yet another modified form of the present invention.

Referring to FIG. 9, there is illustrated yet another form of the present invention. In this form of the invention, the ridge portions 23 adjacent the raised portion 16 are omitted, thereby making recessed portions a part of the overall sidewall portion of the tire. If desired, the raised rib portion may be entirely omitted (not shown).

Figure 10:
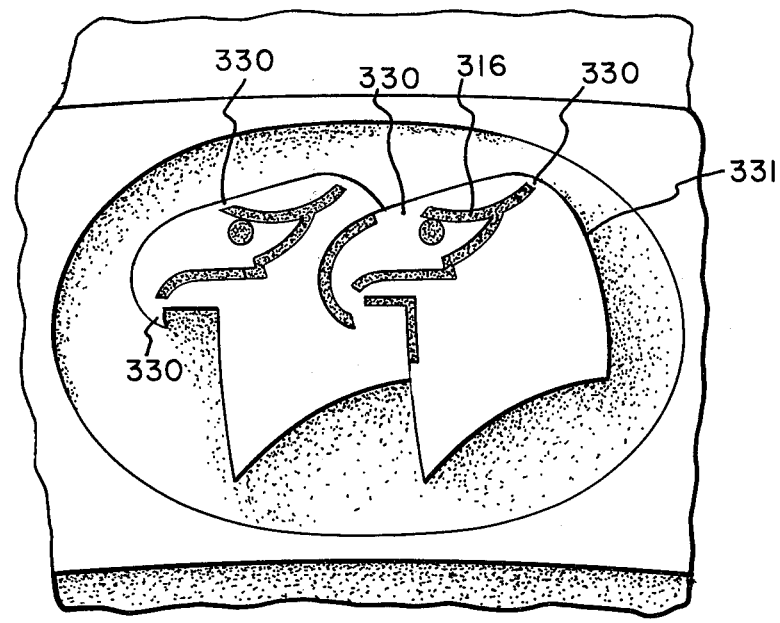
FIG. 10 is an enlarged fragmentary elevational view of the sidewall of a tire illustrating yet still another modified form of the present invention.

Referring to FIG. 10, there is illustrated yet another modified form of the present invention. In this form of the present invention, the blades 316 do not extend to the outer periphery 321 of the indicium as illustrated in FIG. 1. The blades 316 are separated from the periphery 321 by narrow tie bar 330, each tie bar having a length as measured between the end of the blades 320 to the periphery of not less than approximately 0.3 cm (0.130 inches). The tie bar 330 provides additional rigidity to the islands 323 so that during the grinding operation when the outer layer is removed the structure minimizes the possibility of feathering of the edges formed by the narrow blades 316 and the periphery 321 of the raised portions 316. This also permits making the islands of a smaller dimension without sacrificing the definition and clearness desired.

It will be apparent to those skilled in the art that various changes and modifications can be made without departing from the spirit or scope of the present invention.

What is claimed is:

1. An indicium for a rubber article comprising at least one nonlinear narrow groove having a cross-sectional thickness not greater than about 0.152 cm (0.060 inches), a depth of at least 0.102 cm and, a pair of sidewalls disposed at an angle of substantially 90° to the surface of said rubber article, the surface of said indicium being made of a rubber of a first color such that said at least one narrow groove is perceived as a narrow line of a contrasting color in said rubber of said first color, said indicium being surrounded by a recessed portion, the surface portion of said recessed portion being made of a rubber having a second color different from said first color.

2. The indicium according to claim 1 further characterized in that said indicium is raised with respect to the surface of said article.

3. The indicium according to claim 1 or 2 further characterized in that said recessed portion is surrounded by a raised portion being made of a rubber having a color substantially identical to said first color.

4. The indicium according to claim 1 further characterized in that said at least one narrow groove has a cross-sectional thickness not greater than 0.102 cm.

5. The indicium according to claim 1 further characterized in that said at least one narrow groove has a cross sectional thickness of approximately 0.051 cm.

6. The indicium according to claim 1 further characterized in that said at least one narrow groove divides said indicium into at least one island, said island having a length not less than about 0.508 cm. and a width not less than about 0.250 cm.

7. The indicium according to claim 1 further characterized in that said at least one narrow groove does not extend to the periphery of said indicium and is separated therefrom by a tie bar having a length of not less than about 0.3 cm.

8. An indicium for a rubber tire having at least one nonlinear narrow groove having a cross-sectional thickness not greater than about 0.152 cm (0.060 inches), a depth of at least 0.102 cm and, a pair of sidewalls disposed at an angle of substantially 90° to the surface of said rubber article, the surface of said indicium being made of a rubber of a first color such that said at least one narrow groove is perceived as a narrow line of a contrasting color in said rubber of said first color, said indicium being surrounded by a recessed portion, the surface portion of said recessed portion being made of a rubber having a second color different from said first color.

9. The indicium according to claim 8 further characterized in that said indicium is placed on the sidewall of said tire.

10. The indicium according to claim 8 further characterized by said recessed portion is surrounded by a second raised portion being made of a rubber having a color substantially identical to said first color.

11. The indicium according to claim 8 further characterized in that said at least one narrow groove has a cross sectional thickness not greater than 0.102 cm.

12. The indicium according to claim 8 further characterized in that said at least one narrow groove has a cross sectional thickness of approximately 0.0151 cm.

13. The indicium according to claim 8 further characterized in that said at least one narrow groove divides said indicium into at least one island, said island having a length of not less than about 0.508 cm and a width not less than about 0.250 cm.

14. The indicium according to claim 8 further characterized in that said at least narrow groove does not extend to the periphery of said indicium and is separated therefrom by a tie bar having a length of not less than about 0.3 cm.

* * * * *